W. H. King,
Chuck,

№ 47,428.  Patented Apr. 25, 1865.

Witnesses:
Wm Trewin
C. L. Topliff

Inventor:
Wm Haskell King
per Munn & Co
attorneys

UNITED STATES PATENT OFFICE.

WILLIAM HASKELL KING, OF TROY, NEW YORK.

IMPROVED UNIVERSAL CHUCK.

Specification forming part of Letters Patent No. 47,428, dated April 25, 1865.

*To all whom it may concern:*

Be it known that I, WILLIAM HASKELL KING, of Troy, in the county of Rensselaer and State of New York, have invented a new and Improved Universal Chuck; and I do hereby declare that the following is a full, clear, and exact description thereof, which will enable others skilled in the art to make and use the same, reference being had to the accompanying drawings, forming part of this specification, in which—

Figure 3:
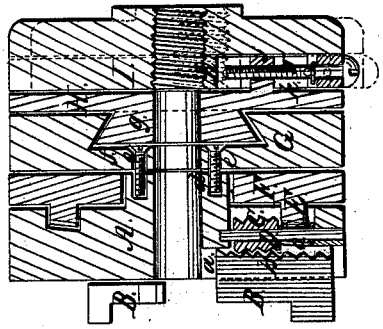
Figure 2:
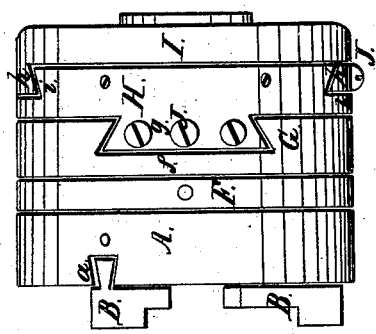
Figure 4:
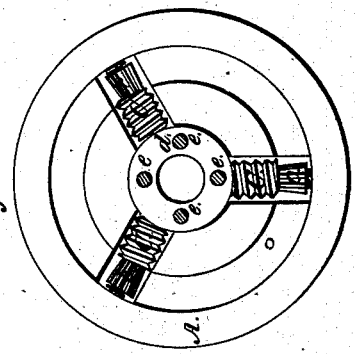
Figure 1:
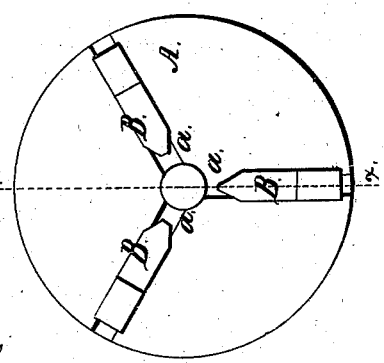

Figure 1 is a front or face view of my invention; Fig. 2, a side view of the same; Fig. 3, a longitudinal section of the same, taken in the line $x$ $x$, Fig. 1; Fig. 4, a rear view of the main part of the chuck.

Similar letters of reference indicate like parts.

This invention relates to a new and improved chuck for lathes, by which the eccentric and concentric chucks are combined, and the chuck rendered capable of being adjusted to suit any kind of work to be operated upon in the lathe.

The invention consists in applying to the ordinary or any suitable concentric chuck one or more sliding or adjustable parts arranged in such a manner that the face of the chuck may, by a very simple manipulation, be adjusted in a concentric or a more or less eccentric position with the mandrel of the lathe, as hereinafter fully set forth.

A represents the body or main portion of the chuck, the front or face side of which is provided with three radial dovetailed grooves, $a$ $a$ $a$, in which jaws B are fitted and allowed to slide freely, the back or rear side of the jaws being provided with screw-teeth $b$, into which screws C gear, the latter being secured to shafts D, on which bevel-pinions $c$ are keyed, the latter having an annular toothed rim, E, gearing into them, (see Fig. 3,) the rim E being attached to a ring, F, which is allowed to turn freely on a hub, $d$, at the rear of A, and by turning this ring the jaws B are made to approach and recede from the center of A, the jaws being moved simultaneously.

G represents a circular plate, which is secured by screws $e$ to the back of the hub $d$, of A, and this plate has a dovetail groove, $f$, made in its rear side and extending entirely across it, said groove receiving a projection, $g$, of corresponding shape on a circular plate, $h$. (See Fig. 3.) A plate, I, is attached to the rear of plate H by means of a dovetail projection, $h$, on the former fitting into a similar groove, $i$, in the latter, and in these plates H I screws J are fitted, which pass through or work in nuts $j$, attached to the plates H I, the screws passing into the projections $g$ $h$ at one end, said projections being slotted, as shown at $k$ for the nuts $j$ to work in. (See Fig. 3.) The plate I is at the rear of the chuck, and the dovetail projections $g$ $h$ of the two plates are at right angles with each other.

From the above description it will be seen that by turning the screws J the plates H I may be adjusted laterally so as to have an eccentric position with the part A, and as the rear plate, I, is secured on the mandrel of the lathe it will, of course, follow that the jaws B, which grasp the work to be turned or operated upon, may be adjusted in a concentric position with the mandrel of the lathe or in a more or less eccentric position therewith. Hence, a combined concentric and an eccentric chuck is obtained, and one which may be used in either capacity equally as well as the ones made separately for each.

Although two sliding plates, H I, are shown and described, still one only may be employed, and if required the chuck may be constructed with more than two plates. The device is extremely simple, and will prove a valuable acquisition for a lathe.

I claim as new and desire to secure by Letters Patent—

A concentric or other chuck provided with one or more laterally-adjustable plates, substantially as herein shown and described, for the purpose of converting a concentric chuck into an eccentric chuck, as set forth.

WILLIAM HASKELL KING.

Witnesses:
AUSTIN F. PARK,
W. W. WIGHT.